(12) United States Patent
Tauscher et al.

(10) Patent No.: US 8,447,893 B2
(45) Date of Patent: *May 21, 2013

(54) USB PERIPHERAL DEVICE COMPRISING LIMITED FUNCTION USB HOST CONTROLLER

(75) Inventors: Brian E. Tauscher, Apex, NC (US); Michael Izquierdo, Cary, NC (US)

(73) Assignee: RGB Systems, Inc., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,850

(22) Filed: Jun. 13, 2012

(65) Prior Publication Data

US 2012/0254486 A1 Oct. 4, 2012

Related U.S. Application Data

(63) Continuation of application No. 12/657,110, filed on Jan. 13, 2010, now Pat. No. 8,205,018, which is a continuation-in-part of application No. 12/657,037, filed on Jan. 12, 2010, now abandoned.

(60) Provisional application No. 61/144,278, filed on Jan. 13, 2009.

(51) Int. Cl.
*G06F 3/00* (2006.01)
*G06F 13/00* (2006.01)

(52) U.S. Cl.
USPC .................................. 710/16; 710/33; 710/36

(58) Field of Classification Search
None
See application file for complete search history.

(56) References Cited

U.S. PATENT DOCUMENTS

| 6,735,663 | B2 * | 5/2004 | Watts et al. | 710/313 |
| 6,993,618 | B2 * | 1/2006 | Chen et al. | 710/305 |
| 7,247,781 | B2 * | 7/2007 | Ikeya | 84/600 |
| 2006/0288150 | A1 * | 12/2006 | Jang et al. | 710/316 |
| 2008/0263243 | A1 * | 10/2008 | Wright et al. | 710/63 |
| 2010/0217892 | A1 * | 8/2010 | Silva et al. | 710/5 |

* cited by examiner

*Primary Examiner* — Idriss N Alrobaye
*Assistant Examiner* — Ronald Modo
(74) *Attorney, Agent, or Firm* — The Hecker Law Group, PLC

(57) ABSTRACT

A USB peripheral device comprising a limited function Universal Serial Bus (USB) host controller configured to control HID compliant USB peripheral devices on a downstream facing USB port is disclosed. The port is also capable of dynamically interfacing to any USB compliant peripheral device.

15 Claims, 8 Drawing Sheets

USB PERIPHERAL DEVICE COMPRISING LIMITED FUNCTION USB HOST CONTROLLER

CROSS-REFERENCE TO RELATED APPLICATIONS

This application is continuation of U.S. patent application Ser. No. 12/657,110 filed Jan. 13, 2010, which is a continuation-in-part of U.S. patent application Ser. No. 12/657,037 filed on Jan. 12, 2010, which claims the benefit of the filing date of U.S. provisional patent application Ser. No. 61/144,278, filed Jan. 13, 2009, all of which are incorporated by reference herein.

BACKGROUND (1) Technical Field

The present invention relates generally to interfacing of peripherals to data processing systems and more particularly to serial interfacing of peripherals having different levels of functionality.

(2) Description of the Related Art

Computer systems are often equipped with peripherals, such as human interface devices (e.g., keyboard, mouse, etc.), data storage devices (e.g., flash memory, hard drives, optical drives, etc.), printers, scanners, communication devices, etc. Such peripherals are often connected in accordance with a standardized interface (e.g., Universal Serial Bus (USB)). Computers are typically provided with USB host controllers to support their USB interfaces. Such USB host controllers allow the computer to communicate with the peripherals, but may not provide a desired level of communication between peripherals. While it would be possible to implement a USB host controller in a peripheral and connect other peripherals to that peripheral to allow that peripheral to interact with the other peripherals and/or to access and even modify data from the other peripherals, implementing a full-functionality USB host controller in a peripheral would be complex and costly, while implementing a limited-functionality USB host controller in the peripheral would not provide support for other peripherals requiring a full-functionality USB host controller. Thus, a cost-effective solution that supports a wide range of peripherals is needed.

BRIEF DESCRIPTION OF THE DRAWINGS

At least one embodiment may be better understood, and its features made apparent to those skilled in the art by referencing the accompanying drawings.

The use of the same reference symbols in different drawings indicates similar or identical items.

DETAILED DESCRIPTION OF THE INVENTION

Figure 1:
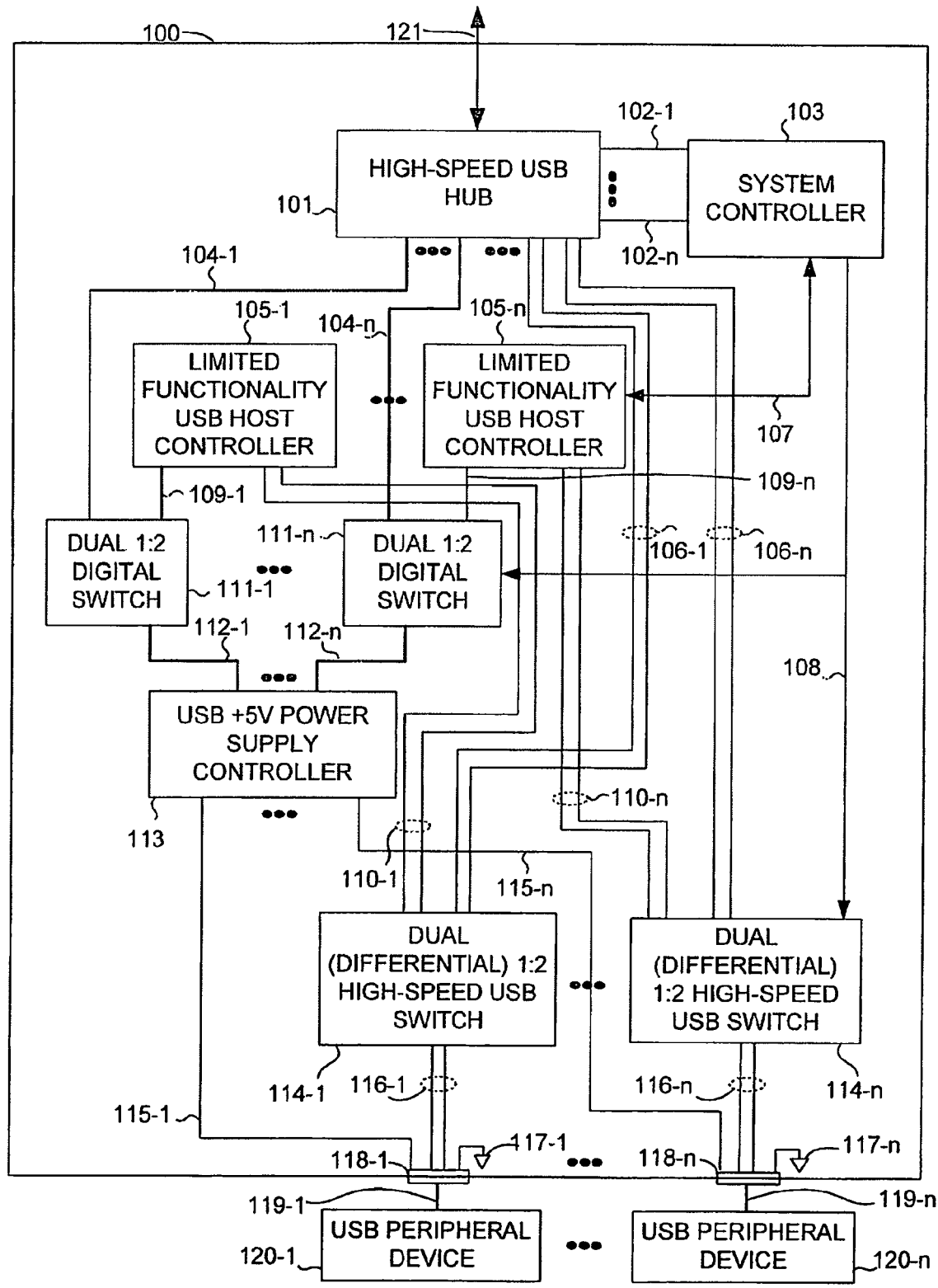
FIG. 1 is a block diagram of a system according to at least one embodiment showing connection of 1 to n downstream USB ports to a limited functionality embedded USB host controller and high-speed USB hub.

A method and apparatus for providing a limited functionality embedded USB host controller (e.g., human interface device (HID) class, full/low speed) to interface to specific peripheral devices (e.g., HID keyboard/mouse) and provide interface capability otherwise unattainable in a hub-only architecture is described. Support for devices not directly supported by the limited functionality USB host controller is enabled by switching any unsupported peripherals into a fully functional high-speed hub controlled by a fully functional host personal computer (PC). The overall result is that key device specific features and interface data is accessible but the overall full functionality of the USB downstream port is not compromised. Any USB compliant device is supported, despite the limited capability of the host controller and the costs associated with a fully functional high-speed capable USB host controller (like the ones found in typical PCs) are avoided.

At least one embodiment allows a limited functionality embedded USB host controller to manage a specific subset of USB peripheral devices on a downstream facing USB port. The USB host controller is limited in that it communicates with low-speed and full-speed USB mouse and keyboard human interface devices (HID) that comply with the USB Device Class Definition for Human Interface Devices Firmware Specification. Despite this limitation of the host controller, the downstream USB port is capable of dynamically interfacing to any USB compliant peripheral device, even one not supported directly by the limited capabilities of the host controller. The approach is scalable, and its capacity can be increased by increasing the complexity of the system controller, number of available ports on the high-speed USB hub, and/or the number of ports on the USB Power Supply Controller.

In embedded system design, cost and complexity are very important parameters in obtaining a successful product. By allowing the direct management of a specific subset of peripheral USB devices, another peripheral can leverage the capabilities of that subset of peripheral USB devices to provide even greater capabilities. Such a peripheral can be configured to support the key features of a larger system design such as keyboard and mouse device emulation, without requiring the cost and complexity of a fully functional high-speed USB host controller. At least one embodiment allows control over specific USB peripheral devices without compromising the capability of the downstream USB port to support any compliant USB devices, even those not directly supported by the limitations of the embedded USB host controller. Under a dual operating mode approach (i.e., selective use of embedded host controller or fully functional hub), the complexity and cost associated with full USB device and peripheral support are offloaded into the host PC, where the system resources are much greater, rather than placing it in the embedded solution, where the resources are limited.

In accordance with at least one embodiment, referring to FIG. 1, a system 100 is illustrated showing the connection of one or more limited functionality embedded USB host controller(s) 105-1 through 105-n or a high-speed USB hub 101 with one or more downstream USB interface port(s) 118-1 through 118-n. On a given system 100 there may be more than one limited functionality USB host controller 105-1 through 105-n, dual 1:2 digital switch 111-1 through 111-n and dual differential 1:2 high speed USB switch 114-1 through 114-n for providing more than one downstream USB port 118-1 through 118-n to support multiple USB peripheral devices 120-1 through 120-n as illustrated in FIG. 1 (two are illustrated as an example). The number of downstream USB ports can be increased by increasing the number of communication channels 106-1 through 106-n of the high-speed USB hub 101 and the complexity of the system control and switch configuration.

Connections are made through a set of dual digital switches 111-1 through 111-n and 114-1 through 114-n which are individually controlled by a single master system controller 103 using digital logic output signals 108. The system controller 103 interfaces to each of the limited functionality USB host controllers 105-1 through 105-n through a common bus interface 107 and monitors the port status indicators 102-1 through 102-n of the high-speed USB hub 101.

High Speed USB Hub

The high-speed USB hub 101 may be a single device or may comprise a cascade of several high-speed USB hubs. The USB hub is capable of supporting USB high-speed data communication signals 106-1 through 106-n as defined in the USB 2.0 Specification, provide the ability to control a USB power supply controller 113 with a port power enable output signal, accept an over-current input signal (grouped together logically as a power control bus 104-1 through 104-n) and generate a port status indicator signal 102-1 through 102-n indicating when a USB peripheral device is enabled by the host PC as described in the USB 2.0 Specification (e.g., Section 11.5.3). The port status indicator is an optional feature in the USB 2.0 Specification, and may be provided by the high-speed hub 101 or some external support circuitry. The high-speed data communication signals 106-1 through 106-n are provided with pull-down resistors as specified in the USB 2.0 Specification. The pull-down resistors may be internal to the high-speed USB hub 101 or added externally to the system 100. When the dual (e.g., differential) 1:2 high-speed USB switch 114-1 through 114-n disconnects the high-speed USB data communication path 106-1 through 106-n away from the downstream data communications bus 116 it is essential that the pull-down resistors force the unconnected high-speed USB data bus 106-1 through 106-n into a disconnect state, as defined in the USB 2.0 Specification, so that the high-speed USB hub 101 will register a disconnect event to the host PC.

Limited Functionality USB Host Controller

At least one embodiment provides for the use of a limited functionality USB host controller 105-1 through 105-n to manage a subset of USB peripheral devices without compromising the ability of the system 100 to connect a host PC to any compliant USB peripheral device, not just the ones supported by the limited functionality of the host controller. The limited functionality USB host controller 105-1 through 105-n supports low-speed and full-speed USB keyboard and mouse devices that comply with the USB Device Class Definition HID Specification. The limited USB host controller 105-1 through 105-n provides the ability to control a USB power supply controller 113 with a port power enable output signal, to accept an overcurrent input signal (grouped together logically as a power control bus 109-1 through 109-n), and to communicate with the system controller over a communication bus 107 (common to all limited functionality USB host controllers if more that one is in the system). The communication bus 107 may be, for example, SPI or I.sup.2C. USB port control information is sent between the system controller 103 and the limited functionality USB host controller 105-1 through 105-n across this bus along with a port status indicator report. The port status indicator report contains information relating to the connection state of the USB peripheral device 120-1 through 120-n attached to the downstream USB port 118-1 through 118-n. Therefore, the limited functionality USB host controller 105-1 through 105-n is capable of detecting USB peripheral device connection and disconnection events on the data communication signals 110-1 through 110-n as defined in the USB 2.0 Specification.

Dual 1:2 Digital Switch

Referring to FIG. 1, the dual 1:2 digital switch 111-1 through 111-n switches power control bus signals between the high-speed USB hub power control bus 104-1 through 104-n or the limited functionality USB host controller power control bus 109-1 through 109-n and the USB+5V power supply controller power control bus 112-1 through 112-n. The switch is controlled from a switch control signal 108 generated by the system controller 103. An important consideration of the digital switch 111-1 through 111-n on the design of the system is that the over-current indicator signals in the 104-1 through 104-n and 109-1 through 109-n power control buses are properly terminated such that they do not generate false over-current events on either the high-speed USB hub 101 or limited functionality USB host controller 105-1 through 105-n when not being actively driven by the USB+5V power supply controller 113.

The switch can consist of either two 1:2 active digital switches or a single dual active switch because there are two signals in the power control bus that are to be switched, a power enable signal and an over-current indicator signal. The switch uses a break-before-make architecture to prevent inadvertent coupling of the power control buses. The term active switch used herein is intended to generically represent an electronically controlled switch. The physical implementation of the switch may be with a relay, an active FET device or any other electronically controlled digital switch mechanism known in the art.

USB+5V Power Supply Controller

In FIG. 1, the USB+5V power supply controller 113 accepts the power control bus signals 112-1 through 112-n consisting of an input power enable signal and an over-current event indicator output signal. The power enable signal is generated by the currently active USB controller which is either the high-speed USB hub 101 or the limited functionality USB host controller 105-1 through 105-n depending upon the state of the power control bus switch 111-1 through 111-n. The USB+5V power supply controller is able to enable or disable the VBUS output 115-1 through 115-n in response to the power supply enable signal and generate an over-current signal in response to an over-current event occurring on the downstream connection VBUS power 115-1 through 115-n, as defined in the USB 2.0 Specification.

Dual 1:2 High-Speed USB Switch

Referring to FIG. 1, the dual (e.g., differential) 1:2 high-speed USB switch 114-1 through 114-n switches differential USB data communication to the downstream USB port data bus 116-1 through 116-n between the high-speed USB hub data bus 106-1 through 106-n (from high speed USB hub 101) or the full/low-speed USB data bus 110-1 through 110-n from the (limited functionality USB host controller). A switch control signal 108 is generated by the system controller 103 and determines which configuration path to activate. The data switch 114-1 through 114-n consists of a dual (e.g., differential) active digital switch that is rated to support high-speed USB data communication channels. By this, the on-resistance, required bandwidth and signal voltage levels comply with the electrical requirements of the USB 2.0 Specification. The data switch 114-1 through 114-n presents a high-impedance to the unconnected side when switched to ensure that the upstream port associated with the data bus can detect a disconnect USB event per the USB 2.0 Specification. The digital switch 114-1 through 114-n should implement a break-before-make connection when switching so that communication on the high-speed hub data bus 106-1 through 106-n does not couple into the limited functionality USB host controller data bus 110-1 through 110-n.

Downstream USB Port

The downstream USB port 118-1 through 118-n consists of a 4-pin USB Type-A female connector as defined in the USB 2.0 Specification. Each downstream USB connection 118-1 through 118-n is comprised of three groups of signals; a +5V power output 115-1 through 115-n, designated as VBUS in the USB 2.0 Specification, a differential pair of data communication signals 116-1 through 116-n, designated as D+ and D− in the USB 2.0 Specification, and a reference ground signal 117-1 through 117-n, designated as GND in the USB 2.0 Specification. The USB GND signal is not switched, but is coupled to the electrical ground plane of the overall system 100 to provide a common reference between all interfaces. A standard 4-wire USB cable 119-1 through 119-n is used to connect typically one (but may be more than one-two are shown in FIG. 1) USB peripheral devices 120-1 through 120-n to the system 100.

Switch Configurations

Figure 2:
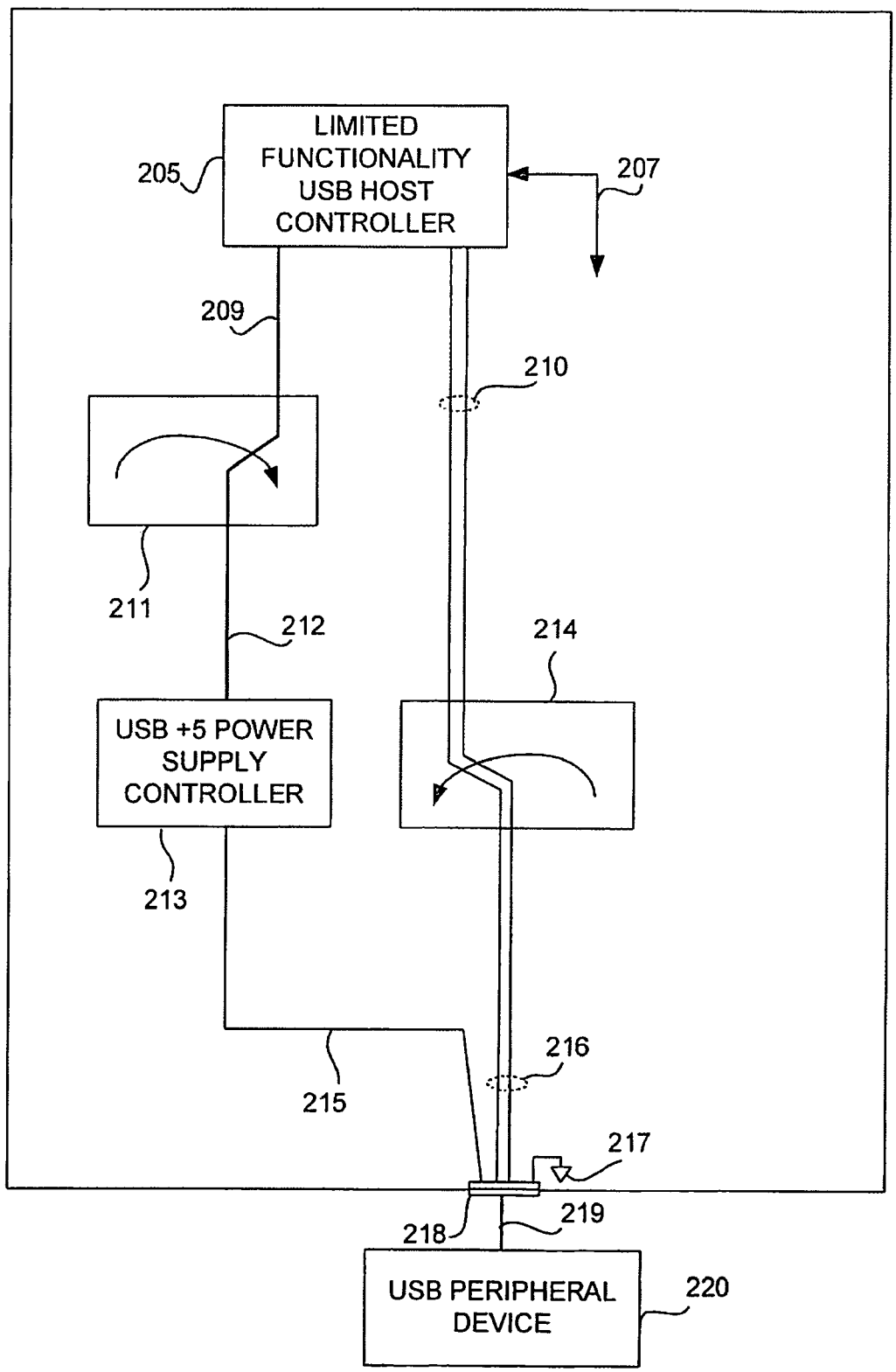
FIG. 2 is a block diagram of an initial configuration of the digital switches illustrating one of the operating modes of at least one embodiment in which the limited functionality embedded USB host controller is in control of the USB peripheral device.

The initial configuration of switches 111-1 through 111-n and 114-1 through 114-n in the system 100 is illustrated in FIG. 2. Initially, the limited functionality USB host controller 105-1 through 105-n is connected to the downstream USB connection port 118-1 through 118-n. This configuration allows the limited functionality host controller to be in direct control of any USB peripheral devices 120-1 through 120-n connected to the downstream USB port 118-1 through 118-n. The configuration in FIG. 2 is also the default configuration mode when no USB peripheral devices are connected to a downstream USB port 118-1 through 118-n.

Figure 3:
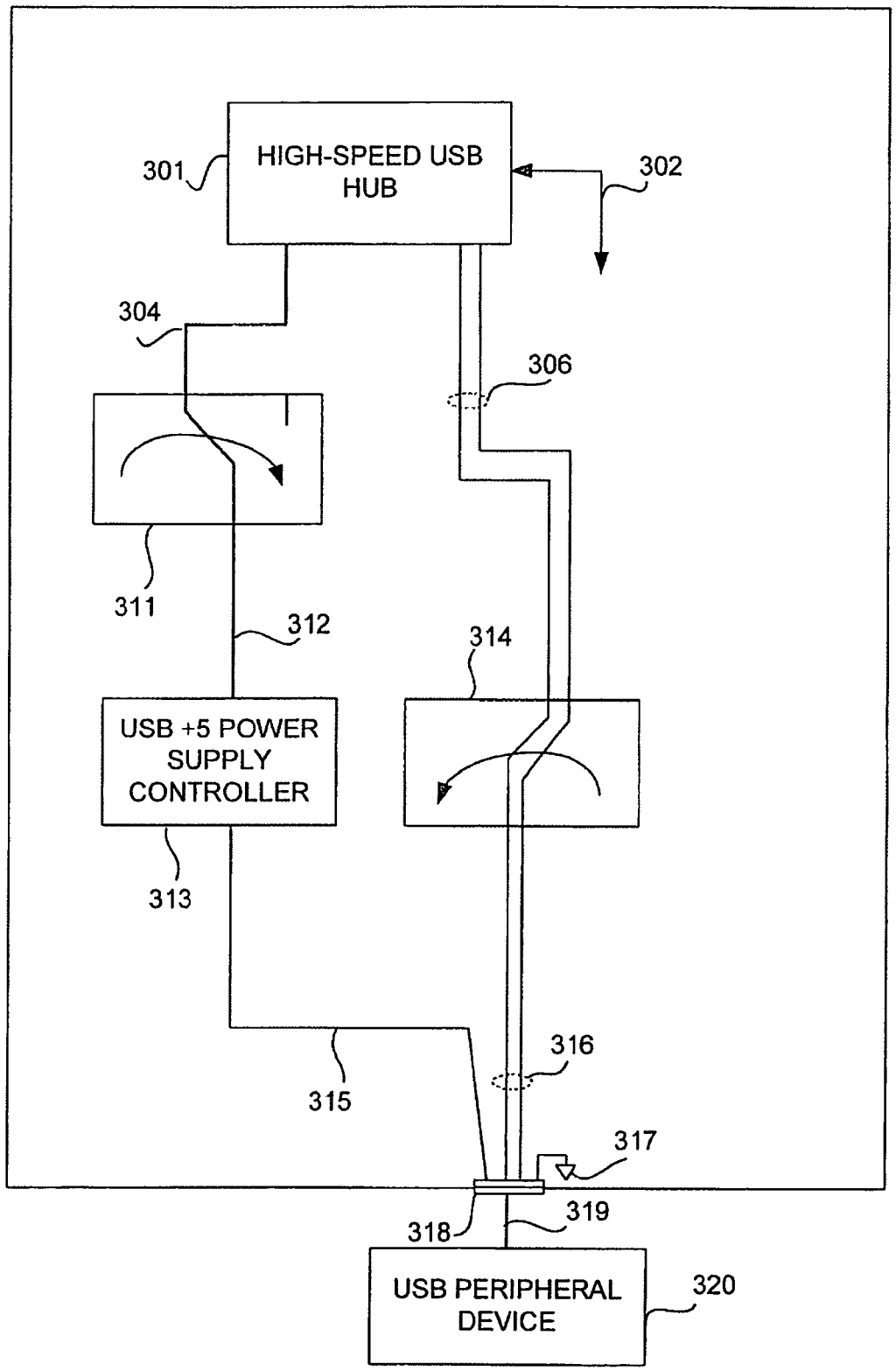
FIG. 3 is a block diagram of a secondary configuration of the digital switches of at least one embodiment illustrating a mode of operation in which the high-speed USB hub is in control of the USB peripheral device.

FIG. 3 shows the configuration of switches 111-1 through 111-n and 114-1 through 114-n in the system 100 when the high-speed USB hub is in control of the downstream USB port 118-1 through 118-n. In this configuration, the high-speed USB hub is in direct control of any USB peripheral devices 120-1 through 120-n connected to the downstream USB port 118-1 through 118-n.

Figure 4A:
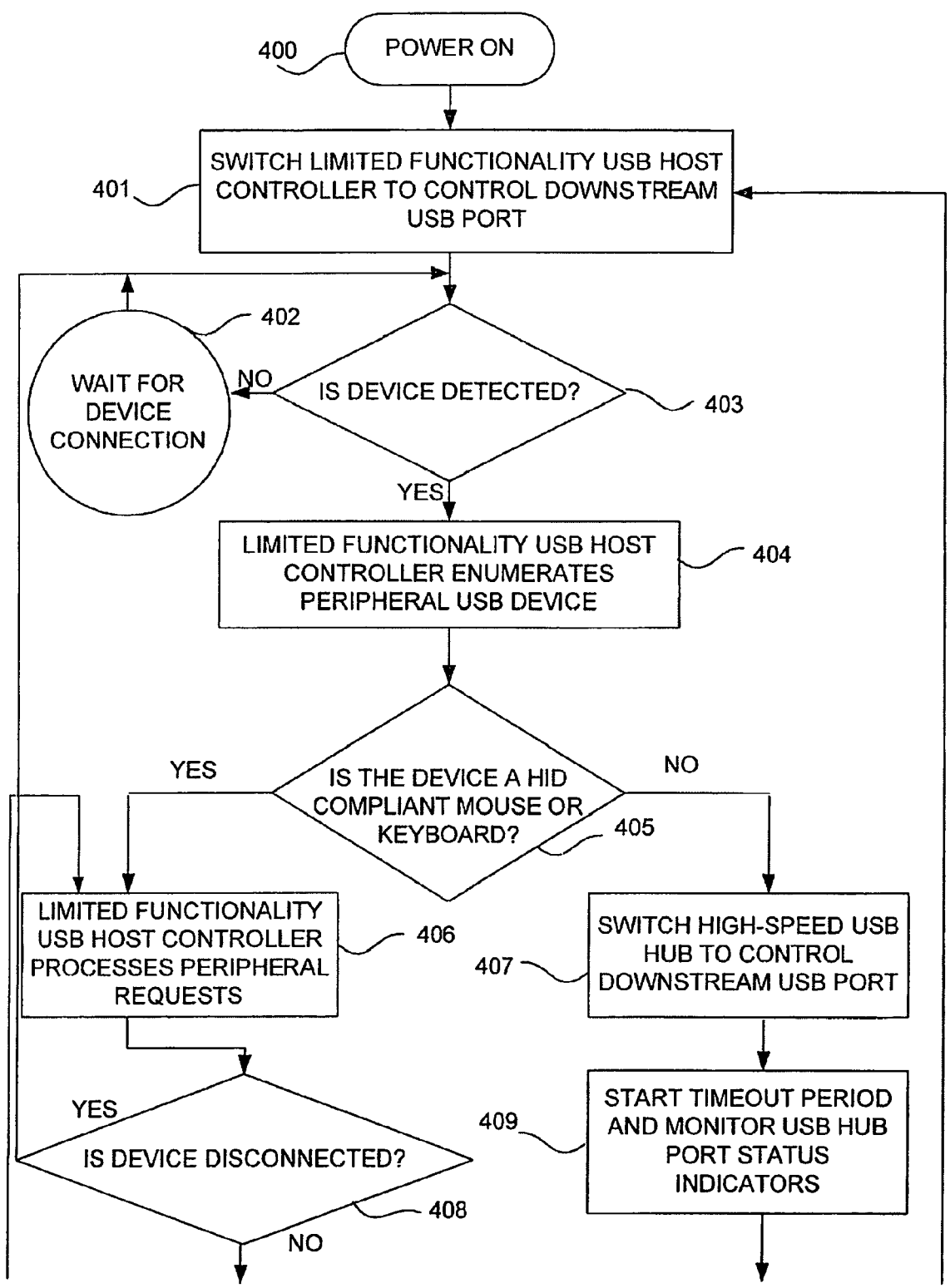
FIGS. 4A & 4B are a flow control diagram outlining a process flow of the system controller in accordance with at least one embodiment during normal system operation.
Figure 4B:
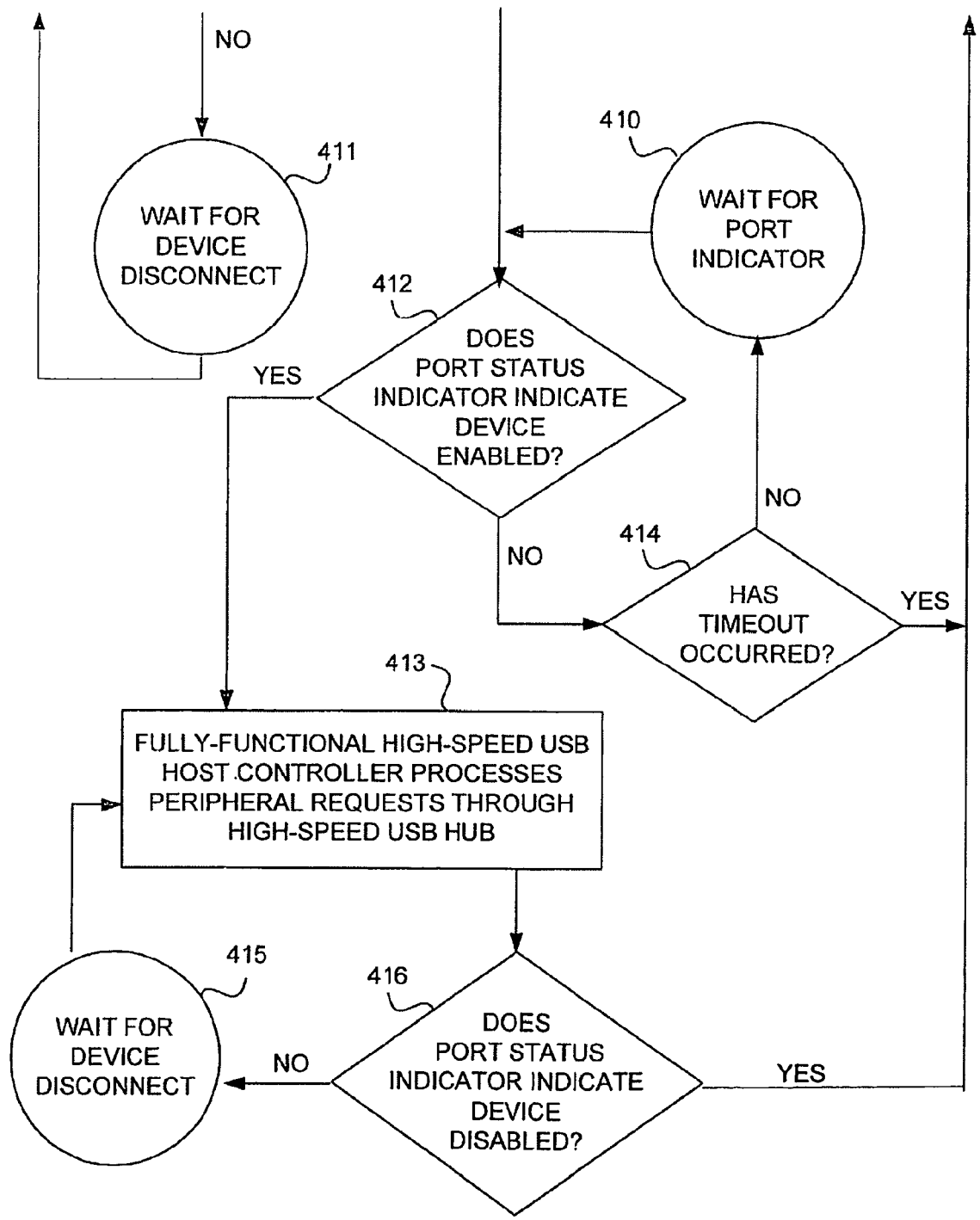

In both switch configuration cases, the system controller 103 monitors the status of the USB peripheral connection through either the high-speed USB hub port indicator signals 102-1 through 102-n or the common communication bus 107 to the limited functionality USB host controller. The system controller 103 is capable of changing the switch status from one configuration to another and does so based on the method illustrated in FIGS. 4A and 4B and described below, in accordance with at least one embodiment.

System Control and USB Device Connection

The following sequence of events occurs when a USB peripheral device 120-1 through 120-n is connected to a downstream USB port 118-1 through 118-n. Power is switched on at block 400. At block 401, The limited functionality USB host controller 105-1 through 105-n is switched to control a downstream USB port. At block 401, the limited functionality USB host controller detects whether a device has been connected by monitoring the state of the USB data bus 110-1 through 110-n per the USB 2.0 Specification.

Figure 5A:
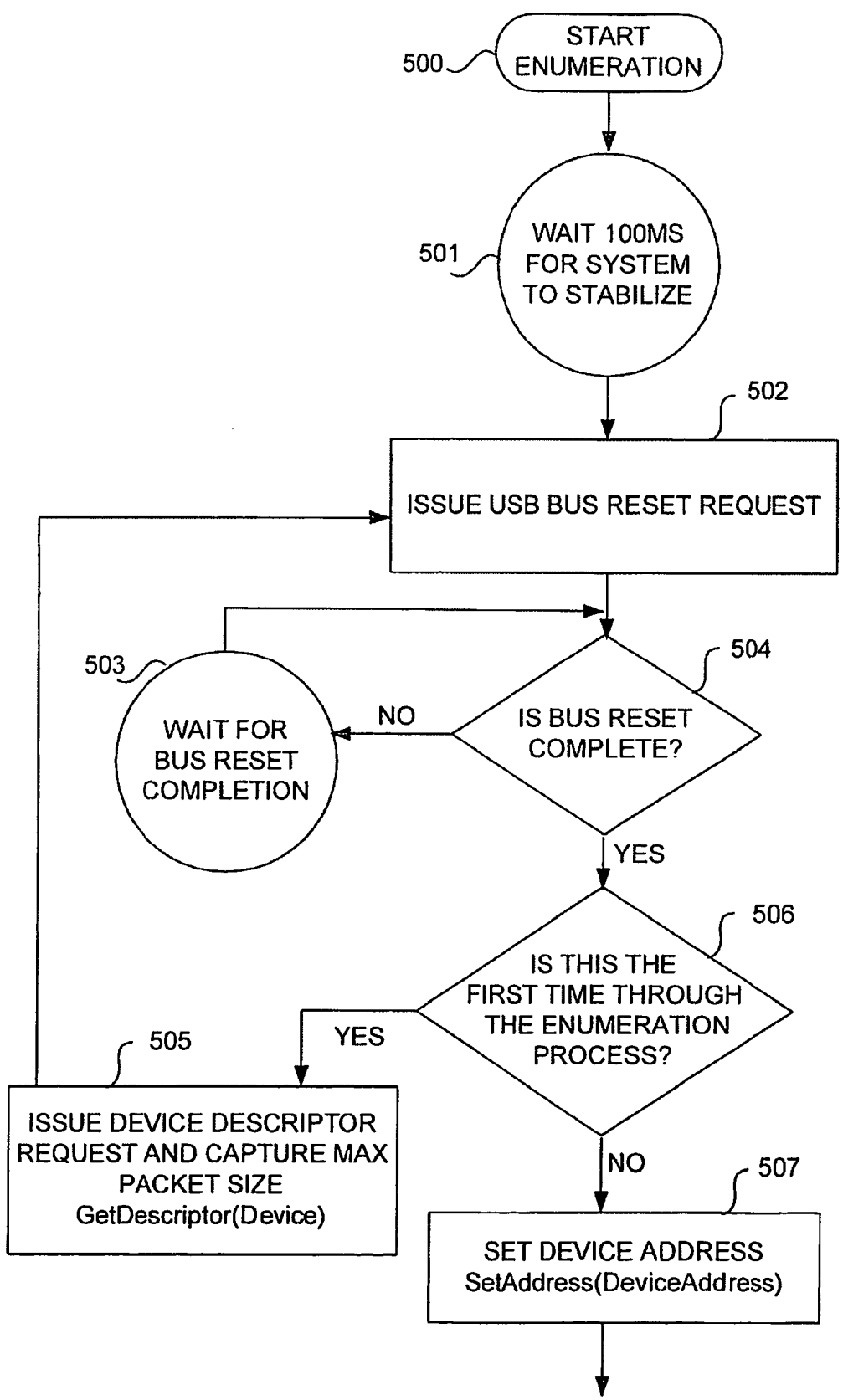
FIGS. 5A & 5B are a flow control diagram outlining a limited functionality USB host controller enumeration process in accordance with at least one embodiment.
Figure 5B:
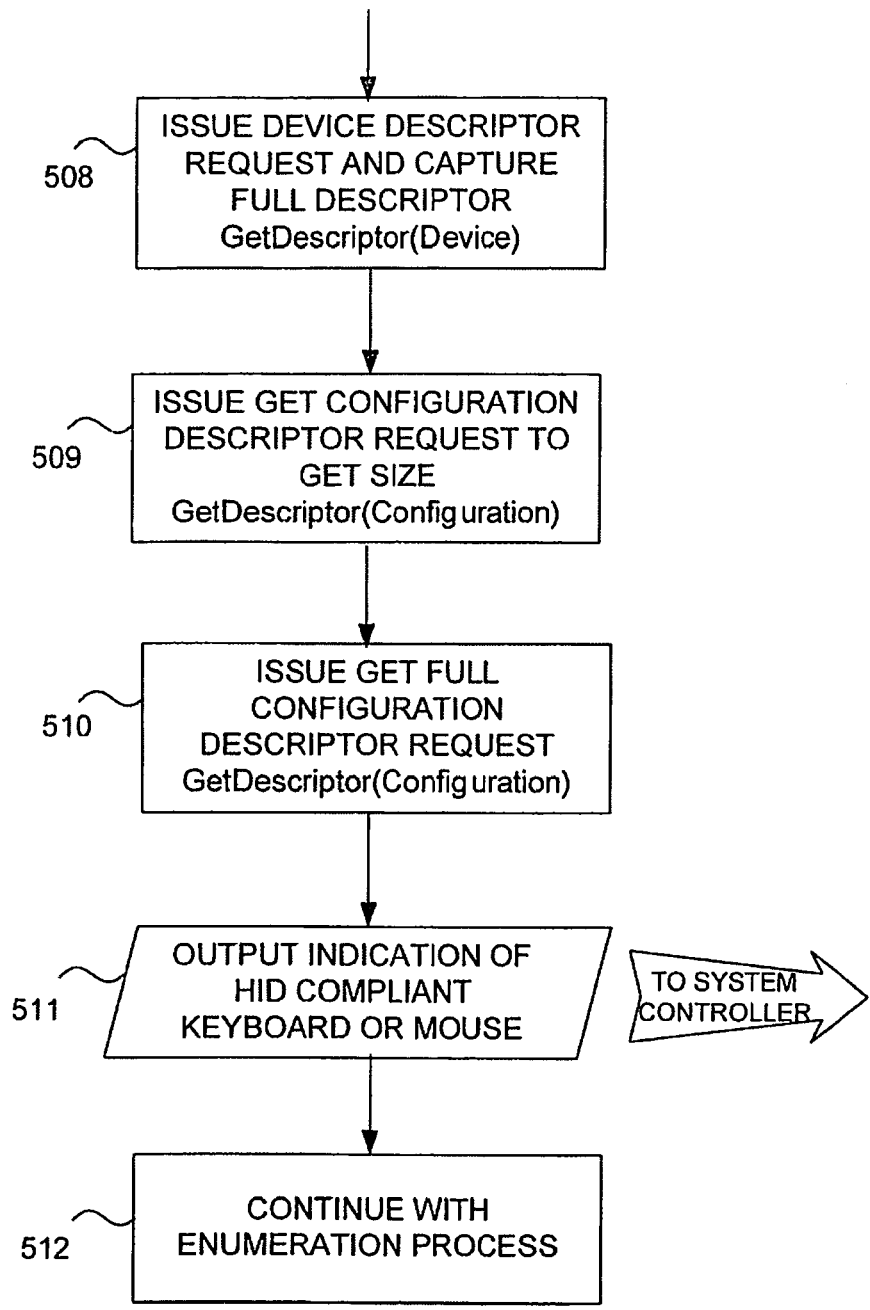

Once a peripheral device is detected, the device is configured by the limited functionality USB host controller 105-1 through 105-n through a process defined in the USB 2.0 Specification (e.g., Section 9.1.2) called bus enumeration at block 404. A USB enumeration process in accordance with at least one embodiment is described in FIGS. 5A and 5B. The enumeration process starts at block 500. The first step of enumeration is to wait after device detection for a minimum of 100 ms to allow completion of the insertion process and for power on the USB peripheral device 120-1 through 120-n to stabilize at block 501. Next, the limited functionality USB host controller enables the port by issuing a USB bus reset command to the USB peripheral device 120-1 through 120-n at block 502. A USB reset bus command is issued by driving a single-ended zero (SE0) on both of the USB data signals (D+ & D−). The specific voltage levels and timing associated with a USB bus reset are defined in the USB 2.0 Specification (e.g., Section 7.1.7.5).

Upon completion of the USB device reset at block 504 the limited functionality USB host controller 105-1 through 105-n issues a device descriptor request at block 505 to obtain the maximum packet size supported by the USB device which is then used to process the remaining descriptor requests. Once the maximum packet size is determined, the limited functionality USB host controller issues another USB bus reset at block 502 to start the bus enumeration process over. Upon determination that the second USB bus reset is complete at block 504, the limited functionality USB host controller 105-1 through 105-n issues a Set Address USB command at block 507 to set the device address on the USB bus. From this point on, the device will respond to the new assigned address value.

Following address assignment at block 507, the limited functionality USB host controller 105-1 through 105-n will issue a Get Device Descriptor USB request and receive the full device descriptor table at block 508. After receiving the full device descriptor at block 508, the limited functionality USB host controller 105-1 through 105-n will issue a Get Configuration Descriptor USB request at block 509. The initial Get Configuration Descriptor request is used to determine the size of the full configuration descriptor for a second Get Configuration Descriptor request for the full report descriptor that is issued at block 510. The full configuration descriptor report contains information about the number and configuration of USB interfaces and endpoints, as defined in the USB 2.0 Specification. From this information, the limited functionality USB host controller can determine whether the attached device is a HID compliant keyboard or mouse. The limited functionality USB host controller 105-1 through 105-n reports this information at block 511, via the common communication bus 107 to the system controller 103 to make a decision as to whether the connected device is a HID compliant mouse or keyboard at block 405. If the enumerated USB peripheral device 120-1 through 120-n is a HID compliant USB mouse or keyboard (supported by the limited functionality USB host controller 105-1 through 105-n) then the system controller does nothing which leaves the limited functionality USB host controller 105-1 through 105-n in control of and processing requests from the USB peripheral device 120-1 through 120-n at block 406. When operating in this configuration, as shown in FIG. 2, the system controller 103 is inserted into the data communication path of the USB peripheral device 120-1 through 120-n. Having the system controller 103 in the power control bus path 112-1 through 112-n and data communication path 116-1 through 116-n of the HID compliant mouse and keyboard devices enables a level of interface control that would not be possible in a high-speed hub 101 only architecture. The specific system control capabilities may include capturing USB data packets to update USB peripheral emulation devices elsewhere in the system 100 or parsing USB data packets for keystroke information.

If, in the other case, the USB peripheral device 120-1 through 120-n is determined not to be a HID compliant mouse or keyboard after bus enumeration at block 405, then the system controller 103 issues a switch command across the switch control bus 108 at block 407 which switches control of the USB peripheral device from the limited functionality USB host controller 105-1 through 105-n to the fully-functional high-speed USB hub 101 resulting in the system being configured as indicated in FIG. 3. Once switched, both power control 112-1 through 112-n and data communication 116-1 through 116-n are under the control of the USB high-speed USB hub 101.

The physical process of switching, based on the requirements of the switches as outlined above, does two important things. First, the connection between the limited functionality USB host controller 105-1 through 105-n and the USB peripheral device 120-1 through 120-n is broken. Breaking this connection will cause the limited functionality USB host controller 105-1 through 105-n to register a USB device disconnect event, per the USB 2.0 Specification and revert to an unconnected state preparing it for accepting a new device in the future. Consequently a connection is now made between the high-speed USB hub 101 data communication bus 106-1 through 106-n and the USB peripheral device 120-1 through 120-n data communication bus 116-1 through 116-n forcing a device detect event to occur on the high-speed USB hub 101 downstream facing port. The second important occurrence after switching is that the power control bus 112-1 through 112-n is momentarily disconnected from the USB+5V power supply controller. The power enable signal in the power control bus 112-1 through 112-n is biased in such a manner that the VBUS power signal 115-1 through 115-n associated with the USB peripheral device 120-1 through 120-n is turned off forcing a power-cycle event on the USB peripheral device 120-1 through 120-n resetting the internal logic and preparing it for connection with the high-speed USB hub port 101.

Once a device detect event, as defined by the USB 2.0 Specification occurs on the high-speed USB hub 101, an independent USB bus enumeration cycle will be initiated by the host PC as supported by the device driver assigned to the USB peripheral device 120-1 through 120-n. Support for a given USB peripheral device 120-1 through 120-n is provided in accordance with the driver support capabilities of the host PC attached to the hub. For example, a USB flash drive could be connected to a Windows PC operating system and utilize the software driver supplied by the flash drive manufacturer.

After switching the USB peripheral device 120-1 through 120-n from the limited functionality USB host controller 105-1 through 105-n to the high-speed USB hub 101, the system controller 103 begins monitoring the port status indicator signals 102-1 through 102-n generated by the high-speed USB hub 101 at block 412. The system controller can determine, from the port status indicator signals 102-1 through 102-n, when the host PC enables the USB peripheral device 120-1 through 120-n (through the high-speed USB hub 101) allowing the system controller to monitor the connection state of the USB peripheral device 120-1 through 120-n to the high-speed USB hub 101. If it is determined at block 414 that the port status indicator signal 102-1 through 102-n is not asserted within a timeout period (indicating the USB peripheral device 120-1 through 120-n was not properly enabled by the host PC) then the system controller can issue a switch command across the switch control bus 108 at block 401 reverting control of the peripheral back to the limited functionality USB host controller 105-1 through 105-n or forcing a second connection attempt with the high-speed USB hub 101. This can occur if the USB peripheral device 120-1 through 120-n is physically removed from the downstream USB port 118-1 through 118-n during the interval of time the physical switching occurs for switches 111-1 through 111-n and 114-1 through 114-n. If it is determined that the port status indicator indicates the USB peripheral device 120-1 through 120-n is enabled by the host PC at block 412 then operation continues at block 413 in the configuration illustrated in FIG. 3 with the high-speed USB hub 101 in control of the peripheral (with the hub being a proxy for the host PC as defined in the USB 2.0 Specification).

System Control and USB Device Disconnect

The following sequence of events occurs when an operational USB peripheral device 120-1 through 120-n is disconnected from a downstream USB port 118-1 through 118-n.

When digital switches 111-1 through 111-n and 114-1 through 114-n in the system 100 are configured as shown in FIG. 2, that is, the limited functionality USB host controller 105-1 through 105-n is in control of a connected HID compliant USB mouse or keyboard at block 406 then physically removing the USB peripheral device 120-1 through 120-n from the downstream USB port 118-1 through 118-n will generate a device disconnect event to the limited functionality USB host controller 105-1 through 105-n at block 408 per the USB 2.0 Specification. The initial state of the system is that illustrated in FIG. 2 so when a device disconnect is registered, the limited functionality USB host controller 105-1 through 105-n is internally reset to prepare for the next detection of a device connect event at block 403 without the need for additional actions.

When the digital switches 111-1 through 111-n and 114-1 through 114-n in the system 100 are configured as illustrated in FIG. 3, that is, the high-speed USB hub 101 is in control 413 of the USB peripheral device 120-1 through 120-n then physically removing the USB peripheral device 120-1 through 120-n from the downstream USB port 118-1 through 118-n will generate a disconnect event to the high-speed USB hub 101, as described in the USB 2.0 Specification. Upon registering the USB disconnect event the high-speed USB hub 101 will inform the host PC that a port status change occurred and that the USB peripheral device 120-1 through 120-n was disconnected. The host PC will, among other things, issue a port disable command changing the state of the port status indicator signal 102-1 through 102-n. The system controller 103 previously monitoring this port status indicator signal at block 416 will cause the configuration of the digital switches 111-1 through 111-n and 114-1 through 114-n to revert back to the initial state at block 401 as shown in FIG. 2 where the limited functionality USB host controller 105-1 through 105-n is managing the downstream USB port 118-1 through 118-n. In this manner the system is returned to default operation and is ready for detection of the next USB peripheral device insertion at block 403.

Figure 6:
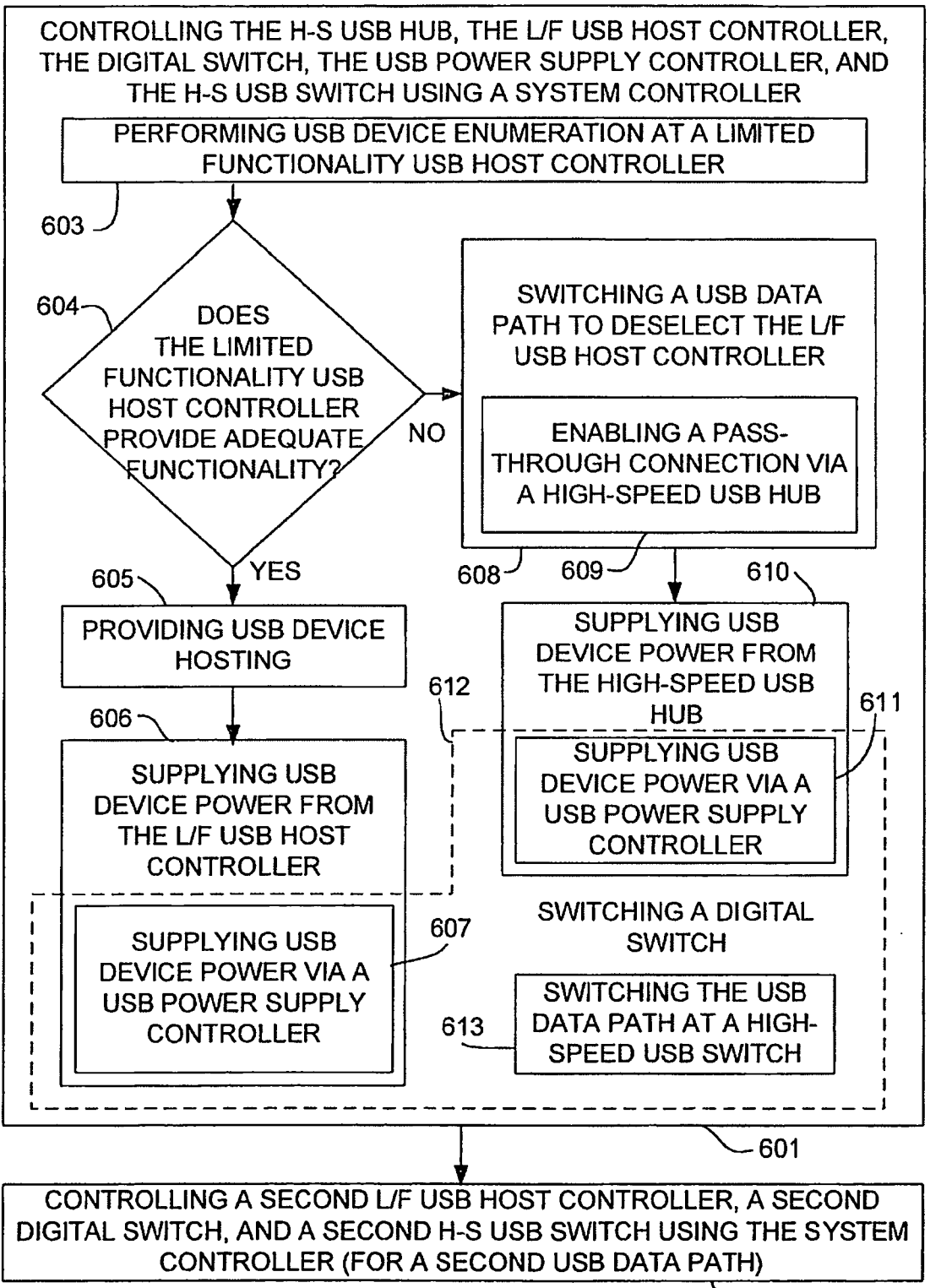
FIG. 6 is a flow diagram illustrating a method in accordance with at least one embodiment.

FIG. 6 is a flow diagram illustrating a method in accordance with at least one embodiment. The method comprises steps 603, 604, 605, and 608. In step 603, USB device enumeration is performed at a limited functionality USB host controller. From step 603, the method continues to step 604. In step 604, a determination is made as to whether or not a limited functionality USB host controller provides adequate functionality for USB device hosting. Adequate functionality is functionality sufficient to host a USB device coupled to the limited functionality USB host controller. For example, if a human interface device (HID) compliant device, such as a keyboard or mouse, is coupled to the limited functionality USB host controller, and the limited functionality USB host controller is able to host such a HID compliant device, then the limited functionality USB host controller provides adequate functionality.

If such adequate functionality is provided, the method continues at step 605. In step 605, USB device hosting is provided by the limited functionality USB host controller. If, however, such adequate functionality is not provided, the method continues from step 604 to step 608. In step 608, a USB data path is switched to deselect the limited functionality USB host controller and to enable a pass-through connection for the USB data path. Step 608 may optionally include step 609. In step 609, the pass-through connection is enabled via a high-speed USB hub.

From step 605, the method may optionally continue to step 606. In step 606, USB device power is supplied from the limited functionality USB host controller. Step 606 may optionally comprise step 607. In step 607, USB device power is supplied via a USB power supply controller.

From step 608, the method may optionally continue to step 610. In step 610, USB device power is supplied from the high-speed USB hub. Step 610 may optionally comprise step 611. In step 611, USB device power is supplied via a USB power supply controller.

In accordance with at least one embodiment, steps 607 and 611 may be facilitated by step 612. In step 612, a digital switch is switched. Step 612 may optionally comprise step 613. In step 613, switching a digital switch comprises switching the USB data path at a high-speed USB switch.

In accordance with at least one embodiment, step 601 may be used to control performance of the method. In step 601, a system controller controls the high-speed USB hub, the limited functionality USB host controller, the digital switch, the USB power supply controller, and the high-speed USB switch. In accordance with at least one embodiment, the method may also comprise step 602. In step 602, the system controller controls a second limited functionality USB host controller, a second digital switch, and a second high-speed USB switch to operate with respect to a second USB data path. Steps 601 and 602 may be performed sequentially and/or simultaneously.

In accordance with at least one embodiment, a method is provided comprising the steps of selecting a limited functionality universal serial bus (USB) host controller to control a downstream USB port; detecting a device connected via the downstream USB port using the limited functionality USB host controller; enumerating a peripheral USB device using the limited functionality USB host controller; and determining if the USB device is supportable by the limited functionality USB host controller. The method further comprises, when the USB device is supportable by the limited functionality USB host controller, switching a circuit to utilize the limited functionality USB host controller to host the USB device. The method further comprises, when the USB device is not supportable by the limited functionality USB host controller, switching a high-speed USB hub to deselect the limited functionality USB host controller.

In accordance with at least one embodiment, the method further comprises, when the USB device is not supportable by the limited functionality USB host controller, utilizing a fully-functional high-speed USB host controller to host the USB device through the high-speed USB hub. The method further comprises, when the USB device is not supportable by the limited functionality USB host controller, determining if a port status indicator of the high-speed USB hub indicates the USB device is enabled. In accordance with at least one embodiment, determining if the USB device is supportable by the limited functionality USB host controller further comprises determining if the USB device is a human interface device (HID) compliant USB device. In accordance with at least one embodiment, determining if the USB device is a HID compliant USB device comprises determining if the USB device is a HID compliant USB device selected from a group consisting of a mouse and a keyboard.

In accordance with at least one embodiment, the enumerating the peripheral USB device comprises issuing a USB bus reset request; waiting for USB bus reset completion; issuing a device descriptor request and capturing a maximum packet size; setting a device address; issuing a device descriptor request and capturing a full descriptor; issuing a get configuration descriptor request to get a size; issuing a get full configuration descriptor request; and outputting a HID compliance indication.

In accordance with at least one embodiment, apparatus comprises a high-speed universal serial bus (USB) switch; a limited functionality USB host controller coupled to a first port of the high-speed USB switch; and a high-speed USB hub coupled to a second port of the high-speed USB switch, wherein the high-speed USB switch switches to direct less demanding USB traffic to the limited functionality USB host controller and switches to direct more demanding USB traffic to the high-speed USB hub. In accordance with at least one embodiment, the apparatus further comprises a system controller coupled to the limited functionality USB host controller and the high-speed USB switch, wherein, when the system controller receives an indication from the limited functionality USB host controller that the limited functionality USB host controller cannot accommodate the more demanding USB traffic, the system controller controls the high-speed USB switch to direct the more demanding USB traffic to the high-speed USB hub.

In accordance with at least one embodiment, a USB power supply controller for controlling USB power and a digital switch for switching power supplied to the USB power supply controller are provided, wherein the digital switch selectably receives power from the limited-functionality USB host controller and the high-speed USB hub. In accordance with at least one embodiment, the digital switch provides the power to the USB power supply controller from the limited-functionality USB host controller when the high-speed USB switch has switched to direct less demanding USB traffic to the limited functionality USB host controller and wherein the digital switch provides the power to the USB power supply controller from the high-speed USB hub when the high-speed USB switch has switched to direct more demanding USB traffic to the high-speed USB hub. In accordance with at least one embodiment, the system controller controls the digital switch in response to the indication.

In accordance with at least one embodiment, a method is provided comprising the steps of performing universal serial bus (USB) device enumeration at a limited functionality USB host controller; determining if the limited functionality USB host controller provides adequate functionality for USB device hosting; when the limited functionality USB host controller provides adequate functionality for USB device hosting, providing USB device hosting; and, when the limited functionality USB host controller does not provide adequate functionality for USB device hosting, switching a USB data path to deselect the limited functionality USB host controller and to enable a pass-through connection for the USB data path. In accordance with at least one embodiment, switching the USB data path further comprises enabling the pass-through connection via a high-speed USB hub.

In accordance with at least one embodiment, the method further comprises, when the limited functionality USB host controller provides adequate functionality for USB device hosting, supplying USB device power from the limited functionality USB host controller; and, when the limited functionality USB host controller does not provide adequate functionality for USB device hosting, supplying USB device power from the high-speed USB hub. In accordance with at least one embodiment, when the limited functionality USB host controller provides adequate functionality for USB device hosting, the step of supplying the USB device power from the limited functionality USB host controller further comprises supplying the USB device power from the limited functionality USB host controller via a USB power supply controller, wherein the USB power supply controller enables the USB device power in response to a limited functionally USB host controller input power enable signal from the limited functionality USB host controller and provides a limited functionality USB host controller over-current event indicator output signal to the limited functionality USB host controller.

In accordance with at least one embodiment, when the limited functionality USB host controller does not provide adequate functionality for USB device hosting, the step of switching the USB data path to deselect the limited functionality USB host controller and to enable the pass-through connection for the USB data path further comprises supplying the USB device power from the limited functionality USB host controller via a USB power supply controller, wherein the USB power supply controller enables the USB device power in response to a high-speed USB hub input power enable signal from the high-speed USB hub and provides a high-speed USB hub over-current event indicator output signal to the high-speed USB hub.

In accordance with at least one embodiment, when the limited functionality USB host controller provides adequate functionality for USB device hosting, the step of supplying the USB device power from the limited functionality USB host controller and, when the limited functionality USB host controller does not provide adequate functionality for USB device hosting, the step of switching the USB data path to deselect the limited functionality USB host controller and to enable the pass-through connection for the USB data path are each facilitated by switching a digital switch.

In accordance with at least one embodiment, when the limited functionality USB host controller does not provide adequate functionality for USB device hosting, the step of switching the USB data path to deselect the limited functionality USB host controller and to enable the pass-through connection for the USB data path further comprises switching the USB data path at a high-speed USB switch. In accordance with at least one embodiment, the method further comprises controlling the high-speed USB hub, the limited functionality USB host controller, the digital switch, the USB power supply controller, and the high-speed USB switch using a system controller. In accordance with at least one embodiment, the method further comprises controlling a second limited functionality USB host controller, a second digital switch, and a second high-speed USB switch using the system controller, wherein the second limited functionality USB host controller, the second digital switch, and the second high-speed USB switch operate with respect to a second USB data path.

In accordance with at least one embodiment, a method of controlling a USB port is tied to a particular machine or apparatus. For example, in accordance with at least one embodiment, the method is tied to a limited functionality universal serial bus (USB) host controller. As another example, in accordance with at least one embodiment, the method is tied to a high-speed USB hub. As yet another example, in accordance with at least one embodiment, the method is tied to a downstream USB port. As a further example, in accordance with at least one embodiment, the method is tied to a device connected via the downstream USB port. As another example, in accordance with at least one embodiment, the method is tied to a peripheral USB device. As yet another example, in accordance with at least one embodiment, the method is tied to a circuit.

In accordance with at least one embodiment, the method for controlling a USB port transforms a particular article into a different state or thing. As one example, in accordance with at least one embodiment, the method transforms a circuit to utilize the limited functionality USB host controller to host the USB device. As another example, in accordance with at least one embodiment, the method transforms a high-speed USB hub to deselect the limited functionality USB host controller. As yet another example, in accordance with at least one embodiment, the method transforms a USB data path to deselect the limited functionality USB host controller. As a further example, in accordance with at least one embodiment, the method transforms a USB data path to enable a pass-through connection for the USB data path. In accordance with at least one embodiment, such transformation may result, for example, in changes of states of semiconductor devices that interact with or refrain from interacting with a USB device and/or an interface coupled thereto and/or changes of states of memory elements that switch a circuit, switch a high-speed USB hub, and/or switch a USB data path.

In accordance with at least one embodiment, elements may be implemented as a single instantiation of those elements or as multiple instantiations of one or more of those elements. As an example, the limited functionality USB host controllers 105-1 through 105-n may be implemented as a single limited functionality USB host controller capable of providing the functionality of the limited functionality USB host controllers 105-1 through 105-n or as multiple instances of limited functionality USB host controllers. As another example, limited functionality USB host controller 205 may be implemented as a single instance of a limited functionality USB host controller or as multiple instances of a limited functionality USB host controller. Also, in accordance with at least one embodiment, a method, for example, a method of FIGS. 4A and 4B, a method of FIGS. 5A and 5B, and/or a method of FIG. 6, may be implemented as a single instance of such method or as multiple instances of such methods.

The invention claimed is:

1. A first USB peripheral device comprising:
   an upstream USB port configured for connecting to a host personal computer;
   a high-speed USB hub connected to said upstream USB port, said high-speed USB hub comprising a first plurality of differential data signal connections;
   a high speed USB switch comprising a second plurality of differential data pair connections and a first control signal connection, a first of said second plurality of differential data signal connections being connected to a first of said first differential data signal connections of said high-speed USB hub;
   a limited function USB host controller comprising a second control signal connection and a differential data signal connection, said differential data signal connection being connected to a second of said second plurality of differential data signal connections of said high speed USB switch, said limited function USB host controller being configured to control HID compliant USB peripheral devices;

a system controller comprising a third control signal connection connected to said first control signal connection of said high speed USB switch, and a fourth control signal connection connected to said second control signal connection of said limited function USB host controller;

a downstream USB port configured for connecting to a second USB peripheral device, said downstream USB port comprising a differential data signal connection connected to a third of said second plurality of differential data signal connections of said high speed USB switch;

said system controller being configured so as to control said high speed USB switch to connect said downstream USB port to said limited function USB host controller when said second USB peripheral device comprises an HID compliant USB peripheral device and to connect said downstream USB port to said high speed USB hub when said second USB peripheral device comprises a USB device that is not a HID compliant USB peripheral device.

2. The first USB peripheral device of claim 1 wherein said high speed USB hub further comprises first plurality of port status indicator signal connections.

3. The first USB peripheral device of claim 2 wherein said system controller further comprises a second plurality of port status indicator connections connected to said first plurality of port status indicator connections of said high-speed USB hub.

4. The first USB peripheral device of claim 1 wherein said system controller is configured so as to control said high speed USB switch to connect said downstream USB port to said limited function USB host controller when said second USB peripheral device comprises an HID compliant USB peripheral device that is a mouse or a keyboard and to connect said downstream USB port to said high speed USB hub when said second USB peripheral device comprises a USB peripheral device that is not an HID compliant mouse or a keyboard.

5. The first USB peripheral device of claim 1 further comprising a USB power supply controller for controlling power supplied to said downstream USB port.

6. The first USB peripheral device of claim 5 further comprising a digital switch comprising a first power control signal connection connected to a second power control signal connection of said USB power supply controller, a third power control signal connection connected to a fourth power control signal connection of said high speed USB hub, and a fifth power control signal connection connected to a sixth power control signal connection of said limited function USB host controller.

7. The first USB peripheral device of claim 6 wherein said digital switch further comprises a fourth control signal connection connected to said third control signal connection of said system controller.

8. The first USB peripheral device of claim 7 wherein said system controller is configured so as to control said digital switch to connect said USB power supply controller to said limited function USB host controller when said second USB peripheral device comprises an HID compliant USB peripheral device and to connect said USB power supply controller to said high speed USB hub when said second USB peripheral device comprises a USB device that is not a HID compliant USB peripheral device.

9. The first USB peripheral device of claim 8 wherein said system controller is configured so as to control said digital switch to connect said USB power supply controller to said limited function USB host controller when said second USB peripheral device comprises an HID compliant USB peripheral device that is a mouse or a keyboard and to connect said USB power supply controller to said high speed USB hub when said second USB peripheral device comprises a USB peripheral device that is not an HID compliant mouse or a keyboard.

10. The first USB peripheral device of claim 1 wherein said system controller is configured to capture USB data packets from said downstream USB port.

11. The first USB peripheral device of claim 10 wherein said system controller is configured to parse said USB data packets for keystroke information.

12. The first USB peripheral device of claim 1 comprising a plurality of downstream USB ports.

13. The first USB peripheral device of claim 12 comprising a plurality of limited function USB controllers.

14. The first USB peripheral device of claim 13 comprising a plurality of high speed USB switches.

15. The first USB peripheral device of claim 14 comprising a plurality of digital switches.

* * * * *